(12) United States Patent
Gielty et al.

(10) Patent No.: US 7,397,781 B2
(45) Date of Patent: Jul. 8, 2008

(54) CONFIGURABLE MULTISLOT CLASS FOR WIRELESS DEVICES

(75) Inventors: Steven Lawrence Gielty, Coquitlam (CA); David Caesar, North Vancouver (CA); Riley Steven Hoyt, Fort Langley (CA)

(73) Assignee: Sierra Wireless, Inc., Richmond, BC (CA)

( * ) Notice: Subject to any disclaimer, the term of this patent is extended or adjusted under 35 U.S.C. 154(b) by 386 days.

(21) Appl. No.: 11/109,201

(22) Filed: Apr. 18, 2005

(65) Prior Publication Data

US 2006/0250957 A1   Nov. 9, 2006

(51) Int. Cl.
*H04B 7/212* (2006.01)
(52) U.S. Cl. .................. 370/337; 370/442; 370/458
(58) Field of Classification Search .......... 370/280, 370/294, 314, 321, 337, 347, 442, 478, 458; 455/452.1, 453, 435.1, 435.3, 450, 452.2, 455/509
See application file for complete search history.

(56) References Cited

U.S. PATENT DOCUMENTS 6,477,151 B1   11/2002   Oksala
6,967,943 B1 *   11/2005   Hamalainen et al. ........ 370/347
2005/0048985 A1   3/2005   Haartsen

FOREIGN PATENT DOCUMENTS

EP   1 489 875 A1   12/2004

OTHER PUBLICATIONS

International Search Report, , PCT/CA2006/000608, dated Aug. 18, 2006.

* cited by examiner

*Primary Examiner*—Duc Nguyen
*Assistant Examiner*—Anthony S Addy
(74) *Attorney, Agent, or Firm*—Thelen Reid Brown Raysman & Steiner LLP

(57) ABSTRACT

A solution is provided wherein the mobile device selects a multislot class based on the profile of the traffic to be utilized by the mobile device. This may be performed manually by a user, or may be performed automatically where an application or driver software automatically and dynamically determines the best multislot class for the applications being used. This can be accomplished, for example, by looking at the classification of the transport control protocol (TCP) port numbers used, by examining the data sent and received by the network, and/or looking up a profile for the user or device. If the user changes applications or some other event occurs on the mobile device that might cause a change in the profile of the traffic, the mobile device may terminate its current multislot class assignment and re-announce itself, allowing the system to transfer the mobile device to a new multislot class.

12 Claims, 4 Drawing Sheets

| Multislot class | Maximum number of slots | | | Minimum number of slots | | | | Type |
|---|---|---|---|---|---|---|---|---|
| | Rx | Tx | Sum | $T_{ta}$ | $T_{tb}$ | $T_{ra}$ | $T_{rb}$ | |
| 1 | 1 | 1 | 2 | 3 | 2 | 4 | 2 | 1 |
| 2 | 2 | 1 | 3 | 3 | 2 | 3 | 1 | 1 |
| 3 | 2 | 2 | 3 | 3 | 2 | 3 | 1 | 1 |
| 4 | 3 | 1 | 4 | 3 | 1 | 3 | 1 | 1 |
| 5 | 2 | 2 | 4 | 3 | 1 | 3 | 1 | 1 |
| 6 | 3 | 2 | 4 | 3 | 1 | 3 | 1 | 1 |
| 7 | 3 | 3 | 4 | 3 | 1 | 3 | 1 | 1 |
| 8 | 4 | 1 | 5 | 3 | 1 | 2 | 1 | 1 |
| 9 | 3 | 2 | 5 | 3 | 1 | 2 | 1 | 1 |
| 10 | 4 | 2 | 5 | 3 | 1 | 2 | 1 | 1 |
| 11 | 4 | 3 | 5 | 3 | 1 | 2 | 1 | 1 |
| 12 | 4 | 4 | 5 | 2 | 1 | 2 | 1 | 1 |
| 13 | 3 | 3 | NA | NA | a) | 3 | a) | 2 |
| 14 | 4 | 4 | NA | NA | a) | 3 | a) | 2 |
| 15 | 5 | 5 | NA | NA | a) | 3 | a) | 2 |
| 16 | 6 | 6 | NA | NA | a) | 2 | a) | 2 |
| 17 | 7 | 7 | NA | NA | a) | 1 | 0 | 2 |
| 18 | 8 | 8 | NA | NA | 0 | 0 | 0 | 2 |
| 19 | 6 | 2 | NA | 3 | b) | 2 | c) | 1 |
| 20 | 6 | 3 | NA | 3 | b) | 2 | c) | 1 |
| 21 | 6 | 4 | NA | 3 | b) | 2 | c) | 1 |
| 22 | 6 | 4 | NA | 2 | b) | 2 | c) | 1 |
| 23 | 6 | 6 | NA | 2 | b) | 2 | c) | 1 |
| 24 | 8 | 2 | NA | 3 | b) | 2 | c) | 1 |
| 25 | 8 | 3 | NA | 3 | b) | 2 | c) | 1 |
| 26 | 8 | 4 | NA | 3 | b) | 2 | c) | 1 |
| 27 | 8 | 4 | NA | 2 | b) | 2 | c) | 1 |
| 28 | 8 | 6 | NA | 2 | b) | 2 | c) | 1 |
| 29 | 8 | 8 | NA | 2 | b) | 2 | c) | 1 |

FIG. 1

CONFIGURABLE MULTISLOT CLASS FOR WIRELESS DEVICES

FIELD OF THE INVENTION

The present invention relates to the field of wireless communications networks. More particularly, the present invention relates to configurable multislot classes for wireless devices.

BACKGROUND OF THE INVENTION

The mobile phone industry has ballooned into one of the most popular technological areas. The latest generation of mobile phone technology is known as the General Packet Radio Service (GPRS), which employs packet switching to allow mobile phones and pocket communication terminals to connect directly to remote networks via the Internet, at much higher bandwidths than older systems. Unlike the older cellular circuit switched data services, GPRS is an "always on" service that does not require the use of a dial-up modem.

GPRS works by overlaying a packet switched data service on top of a circuit switched digital GSM telephone connection, which means that channel bandwidth is consumed only when users are actually sending or receiving data, rather than dedicating an entire channel to one use for a fixed period.

GPRS may work in conjunction with the Enhanced Data rates GSM Evolution (EDGE), which is a faster version of GSM. The EDGE standard is built upon the existing GSM standard, using the same time-division multiple access (TDMA) frame structure and existing cell arrangements.

Since the data transmissions in GPRS/EDGE networks are TDMA based the number of active timeslots used for transmission or reception is a function of the "multislot class" of the device. The mobile terminal makes its multislot class known to the network during the registration process and it can be adjusted once the device is registered on the network. The multislot class defines the maximum number of slots assignable to downlink and uplink channels. FIG. 1 is a diagram illustrating a typical multislot class configuration table as defined in the GPRS Third Generation Partnership Project (3GPP) standard.

The network totally controls the timeslot configuration assignment to the mobile devices and, as such, the mobile device has no control over this assignment (except when it advertises its multislot class).

There are situations, however, where the network infastructure performs an ineffective assignment of timeslots based on the end user application. Broadly speaking, a network can perform an asymmetric timeslot, such as 4 timeslots for the downlink and 1 timeslot for the uplink. One example of an ineffective assignment occurs if the infrastructure effectively treats the timeslot assignment as static even after the downlink traffic goes idle. Treating the assignment as static could mean that only 1 uplink timeslot is used even when there is no downlink traffic. This results in poor uplink throughout for the end user.

Another example of an ineffective assignment occurs in fairly symmetrical applications (e.g., VoIP). Here, on occasion, the network puts the mobile device into an asymmetric configuration even though the traffic is symmetrical. VoIP traffic typically requires more than 1 uplink timeslot to be effective, and thus placement in an asymmetrical configuration would reduce its effectiveness.

These problems are exacerbated because the mobile device operating system is often not very smart—it always asks for the highest class it can. For example, mobile devices will often ask for class 10, which provides for a maximum 4 downlink slots and 2 uplink slots, with a total number of slots not exceeding 5 (see FIG. 1). This decision is made without regard to the type of traffic to the run on the device. The network then compounds this problem by assigning what it thinks is the best allocation of slots within the parameters of the class. For class 10, this typically means assigning 4 downlink slots and only 1 uplink slots. However, in certain circumstances, it might be more beneficial if the mobile device ran in class 9, as then the network could only assign 3 downlink slots and thus would be forced to assign 2 uplink slots as opposed to just 1. These circumstances leave the system completely at the mercy of the network, which has little or no information about the application traffic profile requirement, and yet has to make decisions regarding the class it will assign the device and the configuration of downlink slots and uplink slots it will select within the class.

What is needed is a solution that allows for a more effective assignment of timeslots in a wireless network.

BRIEF DESCRIPTION OF THE INVENTION

A solution is provided wherein the mobile device selects a multislot class based on the profile of the traffic to be utilized by the mobile device. This may be performed manually by a user, or may be performed automatically where an application or driver software automatically and dynamically determines the best multislot class for the applications being used. This can be accomplished, for example, by looking at the classification of the transport control protocol (TCP) port numbers used, by examining the data sent and received by the network, and/or looking up a profile for the user or device. If the user changes applications or some other event occurs on the mobile device that might cause a change in the profile of the traffic, the mobile device may terminate its current multislot class assignment and re-announce itself, allowing the system to transfer the mobile device to a new multislot class.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 1 is a diagram illustrating a typical multislot class configuration table as defined in the GPRS Third Generation Partnership Project (3GPP) standard.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A solution is provided wherein the mobile device selects a multislot class based on the profile of the traffic to be utilized by the mobile device. This may be performed manually by a user, or may be performed automatically where an application or driver software automatically and dynamically determines the best multislot class for the applications being used. This can be accomplished, for example, by looking at the classification of the transport control protocol (TCP) port numbers used, by examining the data sent and received by the network, and/or looking up a profile for the user or device. If the user changes applications or some other event occurs on the mobile device that might cause a change in the profile of the traffic, the mobile device may terminate its current multislot class assignment and re-announce itself, allowing the system to transfer the mobile device to a new multislot class.

Figure 2:
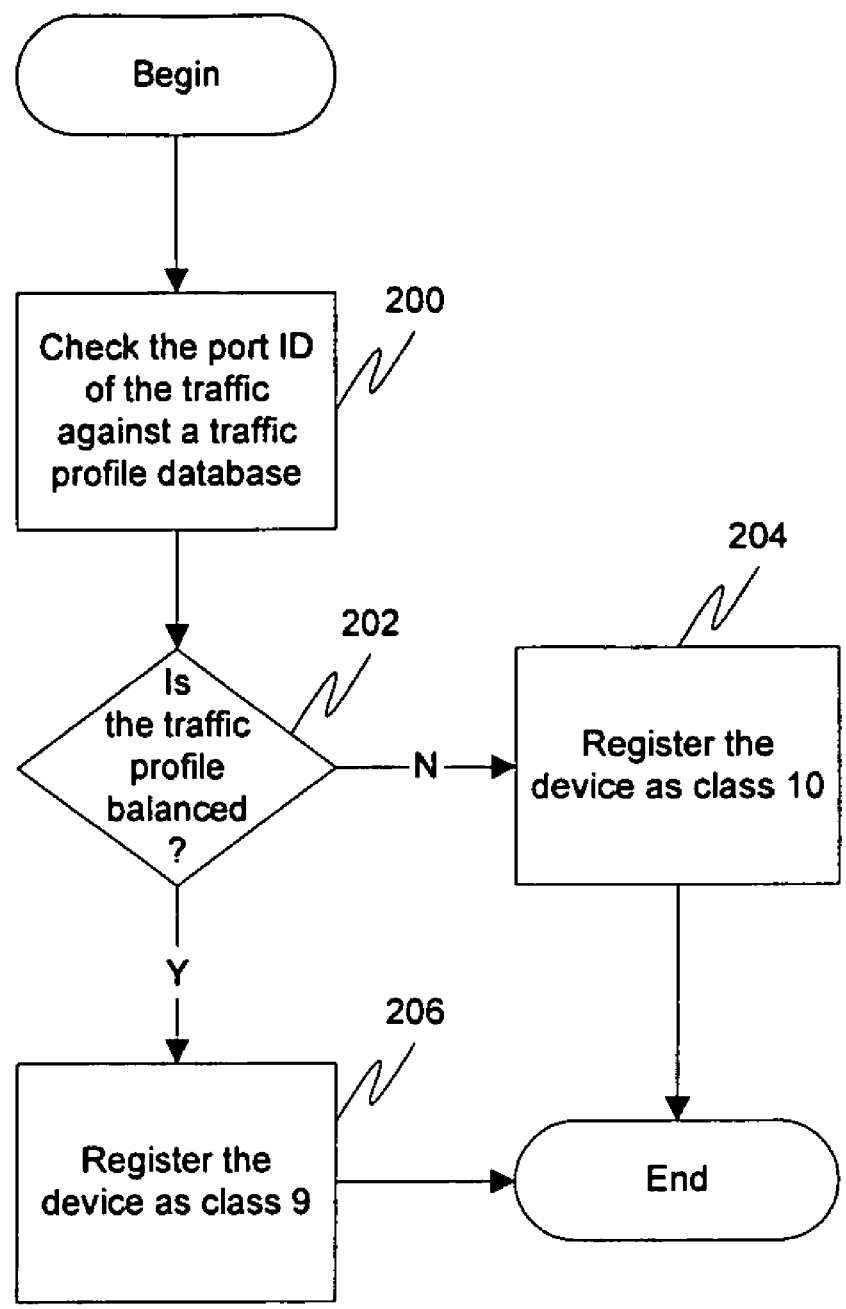
FIG. 2 is a flow diagram illustrating a method for registering a multislot class for a mobile device in a wireless network in accordance with an embodiment of the present invention.

FIG. 2 is a flow diagram illustrating a method for registering a multislot class for a mobile device in a wireless network in accordance with an embodiment of the present invention. At 200, the port ID of the traffic may be checked against a traffic profile database. This database may be a predetermined lookup table, or may be a well known lookup table such as one from the Internet Engineering Task Force (IETF). It should also be noted that utilizing the port ID of the traffic is just one example of the ways that the traffic profile for the traffic may be identified. Other examples include examining the data sent and received by the network, looking up a profile for the user or device, checking the names of applications being run, etc. It should additionally be noted that any lookup table created for such purposes may be modified through the use of a learned process, wherein traffic patterns are examined over time to determine which traffic types belong in which multislot classes.

As part of this process, at 202, it may be determined if the data traffic profile is balanced. If not, then at 204, the mobile device may register itself as class 10, thus likely providing 4 downlink slots and 1 uplink slot. If, however, the data traffic profile is balanced, then the mobile device may register itself as class 9, thus likely providing 3 downlink slots and 2 uplink slots.

Figure 3:
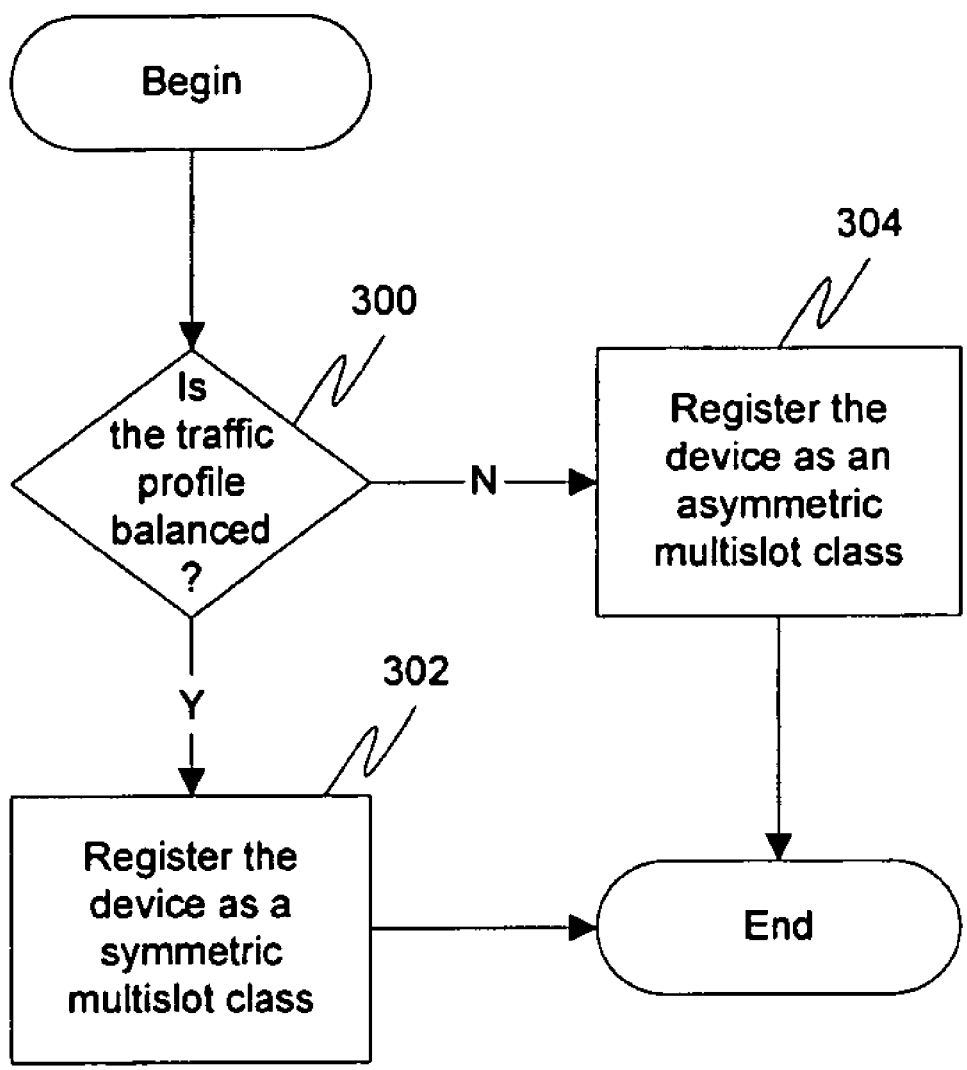
FIG. 3 is a flow diagram illustrating a method for registering a multislot class for a mobile device in a wireless network in accordance with another embodiment of the present invention.

FIG. 3 is a flow diagram illustrating a method for registering a multislot class for a mobile device in a wireless network in accordance with another embodiment of the present invention. At 300, it may be determined if a traffic profile for the mobile device is balanced, wherein the determining is performed by the mobile device. This may include, for example, comparing a port identification for an application on the mobile device with a look-up table to retrieve the traffic profile for the mobile device, examining data sent and received by the mobile device to determine a pattern for the traffic profile for the mobile device, or looking up a profile for the user/device combination. For the look-up table case, the look-up table may be predetermined or created through a learned process. At 302, if the mobile device traffic profile is balanced, then at 302 the mobile device may be registered as a symmetric multislot class, for example class 9 of the GPRS 3GPP standard. If, on the other hand, the mobile device traffic profile is not balanced, then at 304, the mobile device may be registered as an asymmetric multislot, for example, class 10 of the GPRS 3GPP standard.

Figure 4:
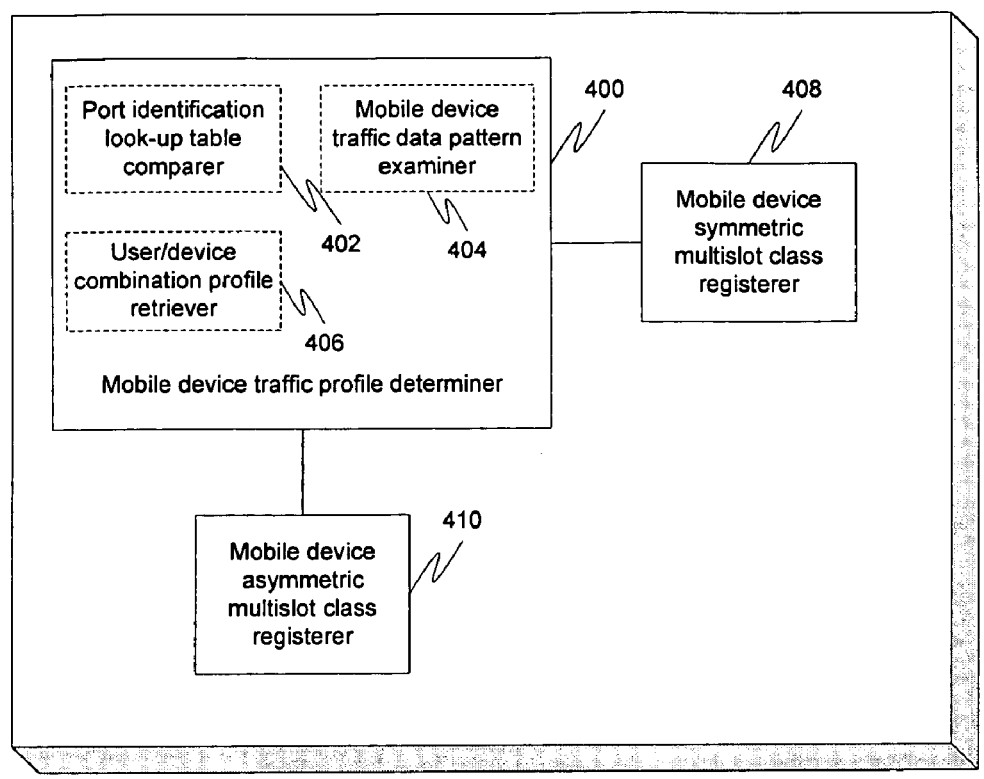
FIG. 4 is a block diagram illustrating an apparatus for registering a multislot class for a mobile device in a wireless network in accordance with another embodiment of the present invention.

FIG. 4 is a block diagram illustrating an apparatus for registering a multislot class for a mobile device in a wireless network in accordance with another embodiment of the present invention. A mobile device traffic profile determiner 400 may determine if a traffic profile for the mobile device is balanced, wherein the determining is performed by the mobile device. This may include, for example, comparing a port identification for an application on the mobile device with a look-up table to retrieve the traffic profile for the mobile device using a port identification look-up table comparer 402, examining data sent and received by the mobile device to determine a pattern for the traffic profile for the mobile device using a mobile device traffic data pattern examiner 404, or looking up a profile for the user/device combination using a user/device combination profile retriever 406. For the look-up table case, the look-up table may be predetermined or created through a learned process. If the mobile device traffic profile is balanced, then a mobile device symmetric multislot class registerer 408 coupled to the mobile device traffic profile determiner 400 may register the mobile device as a symmetric multislot class, for example, class 9 of the GPRS 3GPP standard. If, on the other hand, the mobile device traffic profile is not balanced, then a mobile device asymmetric multislot class registerer 410 coupled to the mobile device traffic profile determiner 400 may register the mobile device as an asymmetric multislot, for example, class 10 of the GPRS 3GPP standard.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for registering a multislot class for a mobile device in a wireless network, the method comprising:
    determining if a traffic profile for the mobile device is balanced, wherein the determining is performed by the mobile device by comparing a port identification for an application on the mobile device with a look-up table to retrieve the traffic profile for the mobile device;
    registering the mobile device as a symmetric multislot class if the mobile device traffic profile is balanced; and registering the mobile device as an asymmetric multislot class if the mobile device traffic profile is not balanced.

2. The method of claim 1, wherein the look-up table is predetermined.

3. The method of claim 1, wherein the look-up table is created through a learned process.

4. The method of claim 1, wherein the symmetric multislot class is class 9 as defined by the General Packet Radio Services (GPRS) Third Generation Partnership Project (3GPP) standard.

5. The method of claim 1, wherein the asymmetric multislot class is class 10 as defined by the General Packet Radio Services (GPRS) Third Generation Partnership Project (3GPP).

6. An apparatus for registering a multislot class for a mobile device in a wireless network, the apparatus comprising:
 a mobile device traffic profile determiner configured to determine if a traffic profile for the mobile device is balanced by comparing a port identification for an application on the mobile device with a look-up table to retrieve the traffic profile for the mobile device;
 a mobile device symmetric multislot class registerer coupled to the mobile device traffic profile determiner and configured to register the mobile device as a symmetric multislot class if the mobile device traffic profile is balanced;
 a mobile device asymmetric multislot class registerer coupled to the mobile device traffic profile determiner and configured to register the mobile device as an asymmetric multislot class if the mobile device traffic profile is not balanced.

7. An apparatus for registering a multislot class for a mobile device in a wireless network, the apparatus comprising:
 means for determining if a traffic profile for the mobile device is balanced, wherein the determining is performed by the mobile device by comparing a port identification for an application on the mobile device with a look-up table to retrieve the traffic profile for the mobile device;
 means for registering the mobile device as a symmetric multislot class if the mobile device traffic profile is balanced; and
 means for registering the mobile device as an asymmetric multislot class if the mobile device traffic profile is not balanced.

8. The apparatus of claim 7, wherein the look-up table is predetermined.

9. The apparatus of claim 7, wherein the look-up table is created through a learned process.

10. The apparatus of claim 7, wherein the symmetric multislot class is class 9 as defined by the General Packet Radio Services (GPRS) Third Generation Partnership Project (3GPP) standard.

11. The apparatus of claim 7, wherein the asymmetric multislot class is class 10 as defined by the General Packet Radio Services (GPRS) Third Generation Partnership Project (3GPP).

12. A program storage device readable by a machine, tangibly embodying a program of instructions executable by the machine to perform a method for registering a multislot class for a mobile device in a wireless network, the method comprising:
 determining if a traffic profile for the mobile device is balanced, wherein the determining is performed by the mobile device by comparing a port identification for an application on the mobile device with a look-up table to retrieve the traffic profile for the mobile device;
 registering the mobile device as a symmetric multislot class if the mobile device traffic profile is balanced; and
 registering the mobile device as an asymmetric multislot class if the mobile device traffic profile is not balanced.

* * * * *